(12) United States Patent
Kataoka et al.

(10) Patent No.: US 6,517,740 B2
(45) Date of Patent: Feb. 11, 2003

(54) PHOSPHOR AND METHOD FOR PREPARING SAME

(75) Inventors: Fumiaki Kataoka, Chiba (JP); Kiyoshi Tamura, Chiba (JP); Yoshitaka Sato, Chiba (JP); Yuji Nomura, Chiba (JP)

(73) Assignee: Futaba Denshi Kogyo Kabushiki Kaisha, Chiba (JP)

( * ) Notice: Subject to any disclaimer, the term of this patent is extended or adjusted under 35 U.S.C. 154(b) by 158 days.

(21) Appl. No.: 09/817,825

(22) Filed: Mar. 26, 2001

(65) Prior Publication Data

US 2001/0023936 A1 Sep. 27, 2001

(30) Foreign Application Priority Data

Mar. 27, 2000 (JP) .................... 2000-086972

(51) Int. Cl.$^7$ ............................ C09K 11/79
(52) U.S. Cl. ............................ 252/301.4 F
(58) Field of Search ...................... 252/301.4 F

(56) References Cited

FOREIGN PATENT DOCUMENTS

JP          11-302640        * 11/1999

* cited by examiner

*Primary Examiner*—C. Melissa Koslow
(74) *Attorney, Agent, or Firm*—Katten Muchin Zavis Rosenman

(57) ABSTRACT

The present invention provides a phosphor of formula $A_2SiO_5:B$ (A is Y or Gd, and B is Ce or Tb) which is characterized by a surface elemental composition represented by (A+B)/Si ranging from 1.5 to 2.5, wherein A is Y or Gd, and B is Ce or Tb; and method for preparing said phosphor. One embodiment of the method is as follows: a $SiO_2$ powder is mixed with co-precipitate $(Y, Ce)_2O_3$ (Ce/Y=0.01), in an amount ranging from 10 to 110 mol % based on the amount of $(Y, Ce)_2O_3$, and the mixture is charged into the inner crucible of a double-walled aluminum crucible. After graphite is charged between the inner and outer crucible, the mixture is calcined at 1450° C. for 2 hours to obtain an $Y_2SiO_5:Ce$ phosphor. The luminous efficiency of a field emission display (FED) prepared employing the $Y_2SiO_5:Ce$ phosphor was measured at an anode voltage of 600V, an electric power input of 30 Wp-p and a duty rate of 1/240. It is desirable that the relative amount of $SiO_2$ based on the amount of $(Y, Ce)_2O_3$ ranges from 40 to 70 mol %, preferably 50 to 60 mol %.

4 Claims, 5 Drawing Sheets

PHOSPHOR AND METHOD FOR PREPARING SAME

FIELD OF THE INVENTION

The present invention relates to a phosphor of formula $A_2SiO_5:B$ (A is Y or Gd, and B is Ce or Tb), e.g., $Y_2SiO_5:Ce$, that emits blue light, and more particularly to a phosphor of formula $A_2SiO_5:B$ (A is Y or Gd, and B is Ce or Tb) employed as an emitting layer in a field emission display (FED) device which utilizes a field emission cathode(FEC) as an electron source or in a vacuum fluorescent display (VFD) device, and method for preparing said phosphor.

BACKGROUND OF THE INVENTION

Field emission display(FED) devices which use a field emission type cathode as an electron source have recently been under development for practical use. Considered as candidate fluorescent materials that may satisfy the blue emission chromaticity and efficiency requirements of FED devices are an $Y_2SiO_5:Ce$ phosphor as well as a ZnS:Ag phosphor which is employed in a cathode ray tube (CRT). ZnS-based phosphors currently in use are phosphors for the CRT, such as ZnS:Ag,Cl, and phosphors for the projection tube, such as ZnS:Ag,Al.

However, when used in an FED or VFD device, a ZnS-based phosphor is decomposed and evaporated by electron beams impinged thereon, causing the fouling and degradation of the emitting source. Therefore, ZnS-based phosphors cannot be used in FED or VFD devices.

To solve the aforementioned disadvantages of sulfide phosphors, $Y_2SiO_5:Ce$ phosphors emitting blue light have been studied. An $Y_2SiO_5:Ce$ phosphor has inferior luminous color and brightness, as compared with a sulfide phosphor, but its use as an emitting layer in FED devices has been studied primarily because it does not foul the emission source.

An $Y_2SiO_5:Ce$ phosphor generally has an extremely short lifetime when used in VFD devices, whereas in FED devices, it has a better emission efficiency than in VFD devices, but still has a relatively short lifetime and also exhibits a sign of emitting source fouling.

To solve the problems mentioned above, the present inventors have suggested, in Japanese Patent Application No. 10-106332, a modified $Y_2SiO_5:Ce$ phosphor whose surface is rich in yttrium and contains BaO as a surface-modifying agent.

When patterning a fluorescent layer with a luminous material in display devices, a slurry containing the luminous material is generally use in the coating process. The above-mentioned modified $Y_2SiO_5:Ce$ phosphor, however, is difficult to use in such a patterning process, because BaO, present on the surface of the phosphor particles as a surface-modifying agent, dissolves in the slurry and causes the gelation a photosensitive agent therein.

Therefore, the present inventors have endeavored to develop a blue emission phosphor having improved lifetime characteristics and luminous efficiency that can be used in FED devices without the aforementioned problem.

SUMMARY OF THE INVENTION

Accordingly, it is an object of the present invention to provide an improved phosphor which has a prolonged lifetime and improved luminous efficiency when used as an emitting layer in FED devices.

In accordance with one aspect of the present invention, there is provided a phosphor of formula $A_2SiO_5:B$ which is characterized by a surface elemental composition represented by (A+B)/Si ranging from 1.5 to 2.5, wherein A is Y or Gd, and B is Ce or Tb.

In accordance with another aspect of the present invention, there is provided a method for preparing said phosphor.

BRIEF DESCRIPTION OF THE DRAWINGS

The above and other objects and features of the present invention will become apparent from the following description thereof, when taken in conjunction with the accompanying drawings wherein.

DETAILED DESCRIPTION OF THE INVENTION

Figure 1:
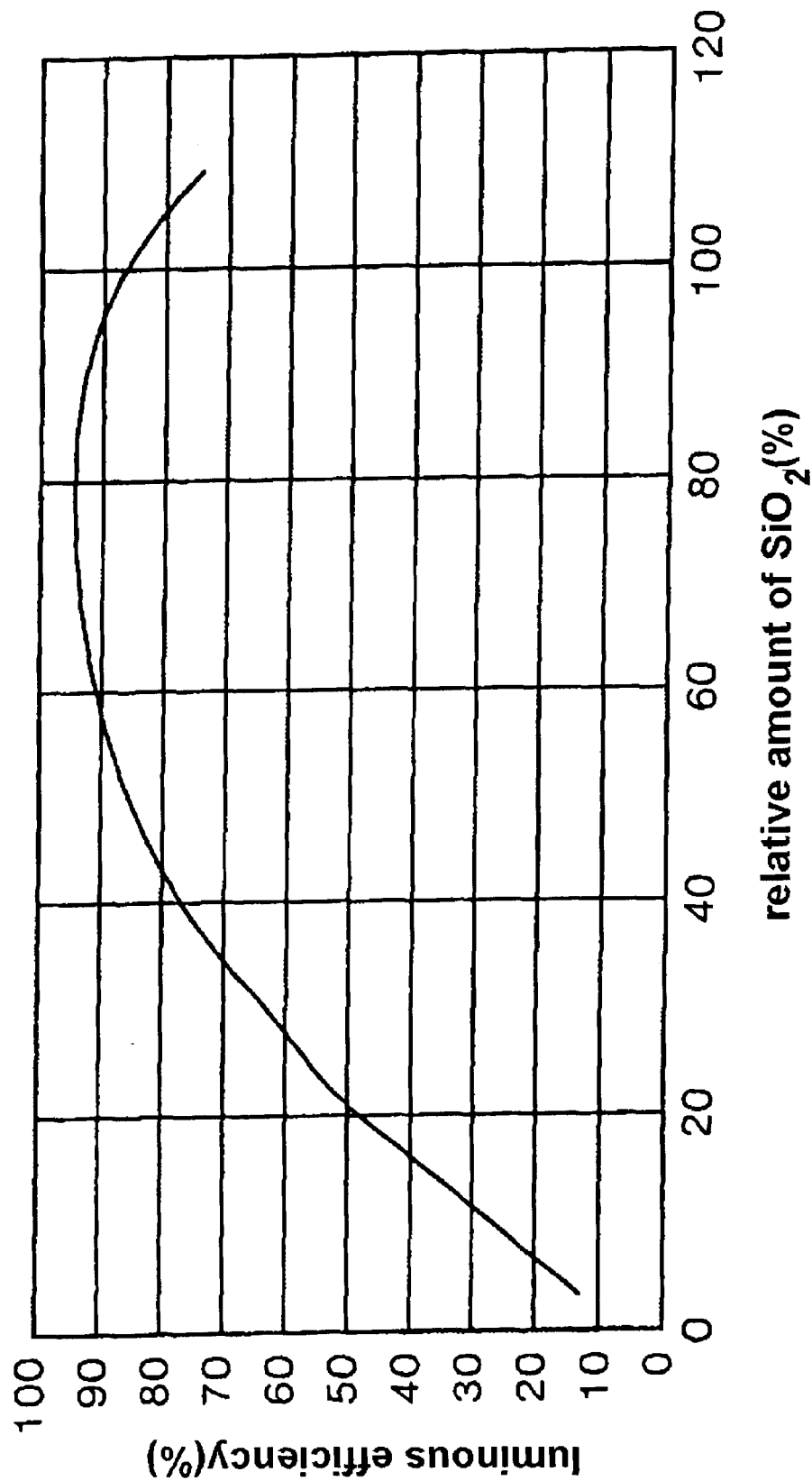
FIG. 1 shows the relationship between the luminous efficiency of the FED device using the phosphor of Example 1 and the relative amount of $SiO_2$ in the $(Y, Ce)_2O_3$ phosphor.

When used in a field emission display (FED) device, a phosphor of formula $A_2SiO_5:B$ (A is Y or Gd, and B is Ce or Tb), e.g., $Y_2SiO_5:Ce$, exhibits an extremely short lifetime and requires a high luminescence start voltage. These problems are believed to be caused by gases, such as $H_2O$ and $CO_2$ adsorbed on the surface of the phosphor.

Therefore, the present inventors have examined whether the adverse effect caused by adsorbed gases can be alleviated by decreasing the relative amount of surface Si, which provides sites for gas adsorption, by increasing the relative amount of A(Y or Gd) on the surface of the phosphor. As a result, the present inventors have found that a phosphor having satisfactory performance characteristics can be obtained, not only by increasing the surface A/Si atomic ratio, but also by carefully controlling the relative amounts of the components of the phosphor within a certain range. There has also been established a method for preparing such a phosphor having the desirable composition.

Thus, the inventive phosphor of formula $A_2SiO_5:B$, which is characterized by a surface elemental composition represented by (A+B)/Si ranging from 1.5 to 2.5, has a better emission efficiency and lifetime characteristics than a conventional phosphor; wherein A is Y or Gd, and B is Ce or Tb.

One embodiment of the method for preparing the phosphor of formula $A_2SiO_5:B$ which is characterized by a surface elemental composition represented by $(A+B)/Si$ ranging from 1.5 to 2.5, comprises mixing $(A, B)_2O_3$ with $SiO_2$ in an amount of 40 to 70 mol % based on the amount of $(A, B)_2O_3$, and calcining the mixture in a double-walled aluminum crucible under a reducing atmosphere to obtain the phosphor having a modified surface; wherein A is Y or Gd, and B is Ce or Tb.

Another method for preparing the inventive phosphor comprises adding a fine powder of $(A, B)_2O_3$ to a phosphor having a stoichiometric amount of Si according to formula $A_2SiO_5$:B (a primary phosphor) to produce a mixture, and calcining the mixture; wherein A is Y or Gd, and B is Ce or Tb. The addition step may be conducted by mixing the fine powder of $(A, B)_2O_3$ and the primary phosphor, or by coating the primary phosphor with the fine powder of $(A, B)_2O_3$ using a conventional coating method, e.g., high frequency plasma.

The present invention is further described and illustrated in examples, which are, however, not intended to limit the scope of the present invention.

EXAMPLE 1

A $SiO_2$ powder was mixed with co-precipitated (Y, Ce)$_2O_3$ (the Ce/Y atomic ratio was 0.01), in an amount ranging from 10 to 110 mol % based on the amount of (Y, Ce)$_2O_3$, and the mixture was charged into the inner crucible of a double-walled aluminum crucible. After graphite was charged between the inner and outer crucible, the mixture was calcined at 1450° C. for 2 hours to obtain an $Y_2SiO_5$:Ce phosphor.

The resulting $Y_2SiO_5$:Ce phosphor was powdered, and a slurry containing the powder was coated on an anode substrate using a conventional slurry coating process to form a luminous layer. The anode substrate coated with the luminous layer was combined with a cathode substrate to obtain a field emission display (FED).

The luminous efficiency of the display obtained was measured by allowing the luminous layer to emit at an anode voltage of 600V, an electric power input of 30 Wp-p and a duty rate of 1/240. The results are shown in FIG. 1.

Figure 2:
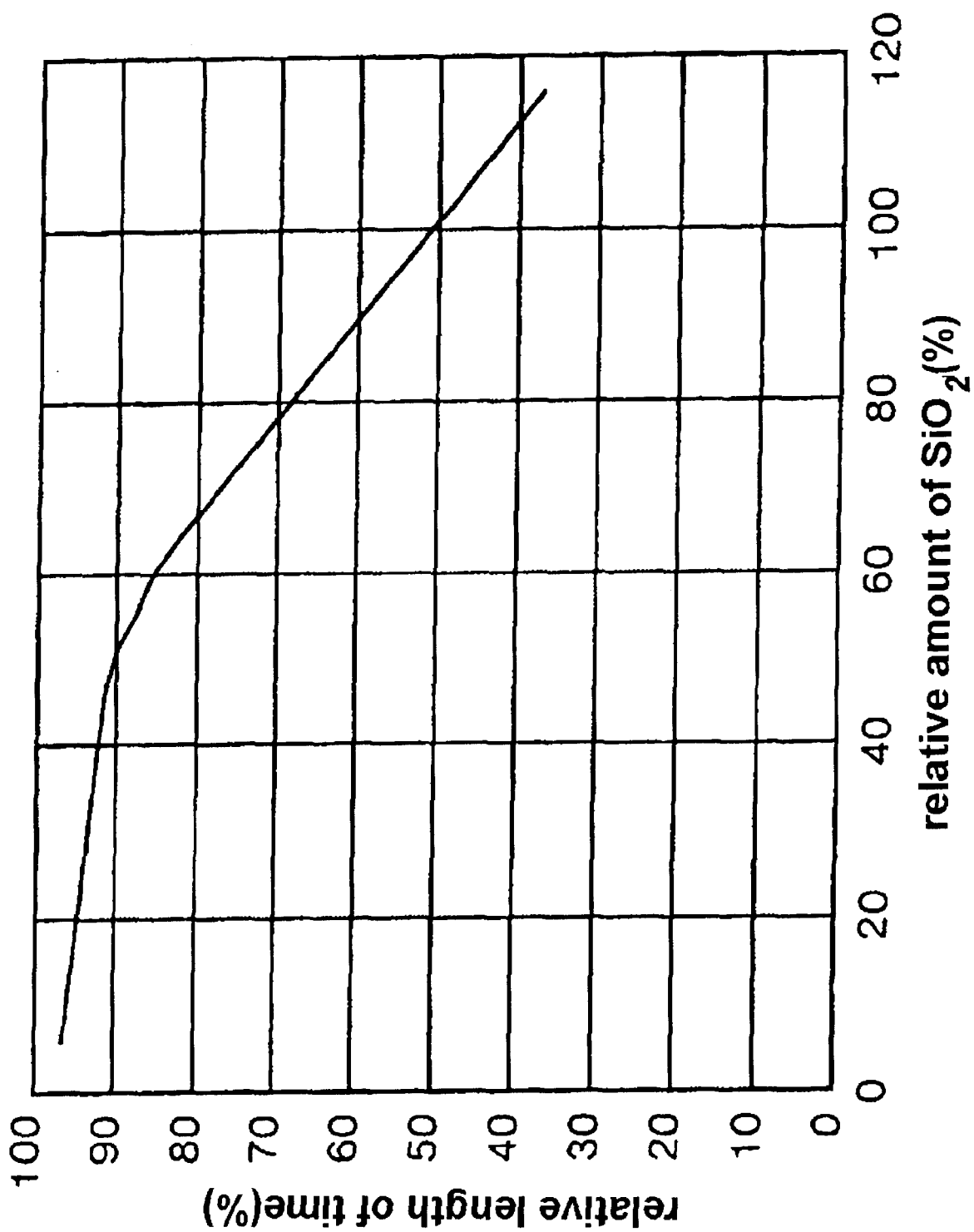
FIG. 2 depicts the relationship between the relative lengths of time required until the emission current of FED is reduced by half and the relative amount of $SiO_2$ in the $(Y, Ce)_2O_3$ phosphor of Example 1.

FIG. 2 depicts the relationship between the relative lengths of time required until the emission current of the FED is reduced by half and the relative amount of $SiO_2$ in the phosphor, the relative amount of $SiO_2$ being the amount based on the stoichiometric amount of $SiO_2$ required to form bulk $Y_2SiO_5$:Ce.

As can be seen from the above results, the luminous efficiency and emission maintenance characteristics of the FED vary with the $SiO_2$ content, and under the conditions employed in this example, it is desirable that the relative amount of $SiO_2$ ranges from 40 to 70%, preferably 50 to 60%.

Figure 3:
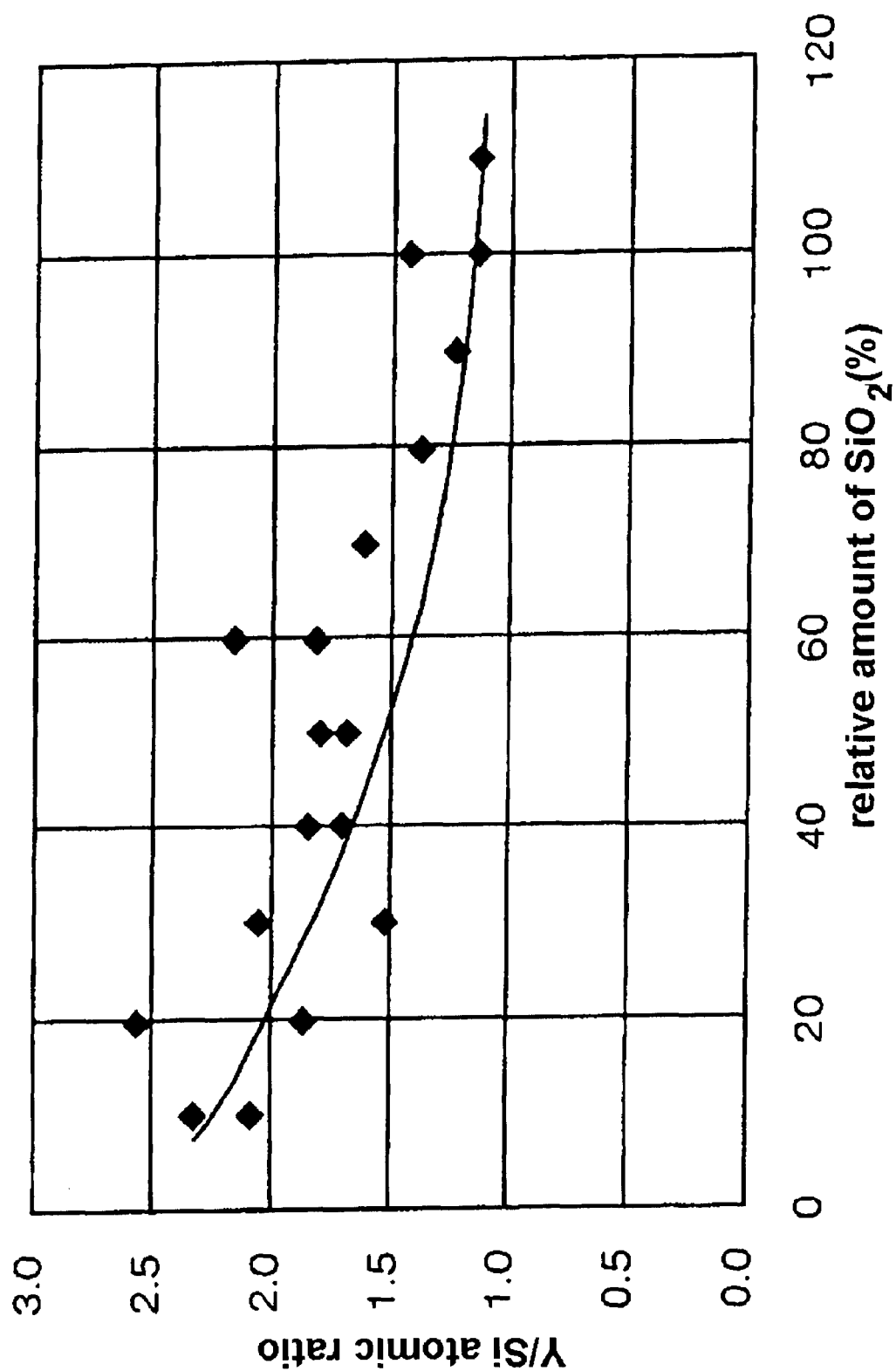
FIG. 3 demonstrates the relationship between the Y/Si atomic ratio determined with an auger electron spectrometer (AES) and the relative amount of $SiO_2$ in the $(Y, Ce)_2O_3$ phosphor of Example 1.

Surface compositions of the $Y_2SiO_5$:Ce phosphors obtained above were determined by auger electron spectroscopy (AES). As shown in FIG. 3, the Y/Si atomic ratio depends on the amount of $SiO_2$ added to (Y, Ce)$_2O_3$. The surface Y/Si ratio of the phosphor decreases as the amount of added $SiO_2$ increases, and when a stoichiometric amount of $SiO_2$(100% $SiO_2$) is used, the surface Y/Si ratio is much lower than the theoretical ratio of 2, i.e., the surface is Si-rich. This result suggests that in the calcination step, $SiO_2$ is deposited on the surface of (Y, Ce)$_2O_3$ particles and when the relative amount of $SiO_2$ is 100%, a compound, such as $Y_2Si_2O_7$:Ce, is formed on the surface of the phosphor. Such a compound has a low luminous efficiency, and when irradiated by an electron beam, releases gases, such as $O_2$, which foul up the emission-source.

Thus, the luminous efficiency can be improved, and the problem of emission source fouling can be prevented by controlling the surface composition of the $Y_2SiO_5$:Ce phosphor to a desired range.

EXAMPLE 2

Figure 4:
FIG. 4 shows an electron microphotograph of the $Y_2SiO_5:Ce$ phosphor of Example 2 coated with a $(Y, Ce)_2O_3$ powder according to a high frequency plasma method.

A $SiO_2$ powder was added to co-precipitate (Y, Ce)$_2O_3$ in a relative amount of 100% to obtain a $Y_2SiO_5$:Ce phosphor having a bulk Y/Si ratio of 2 (hereinafter, a primary phosphor) and then, the primary phosphor was coated with a fine powder of (Y, Ce)$_2O_3$ to a level of 11 wt % using a high frequency plasma method. The electron microphotograph of the resulting phosphor was shown in FIG. 4.

Figure 5:
FIG. 5 shows an electron microphotograph of the phosphor obtained after calcining the $Y_2SiO_5:Ce$ phosphor containing the $(Y, Ce)_2O_3$ powder of FIG. 4 at 1400° C. for 1 hour.

The resulting phosphor was calcined under a reducing atmosphere in the presence of graphite as in Example 1 at 1400° C. for 1 hour. The electron microphotograph thereof is shown in FIG. 5.

A field emission display (FED) was prepared using the resulting phosphor; and its luminous efficiency and residual luminance after certain lifetime were measured to be 110% higher and 183% higher, respectively, as compared with an FED prepared using the primary phosphor.

The surface Y/Si atomic ratio of the phosphor of this example was determined by AES to be 1.83, which was similar with its bulk composition. In this preparation, the amount of (Y, Ce)$_2O_3$ used is preferably 1 to 20% based on the amount of the primary phosphor.

EXAMPLE 3

Figure 6:
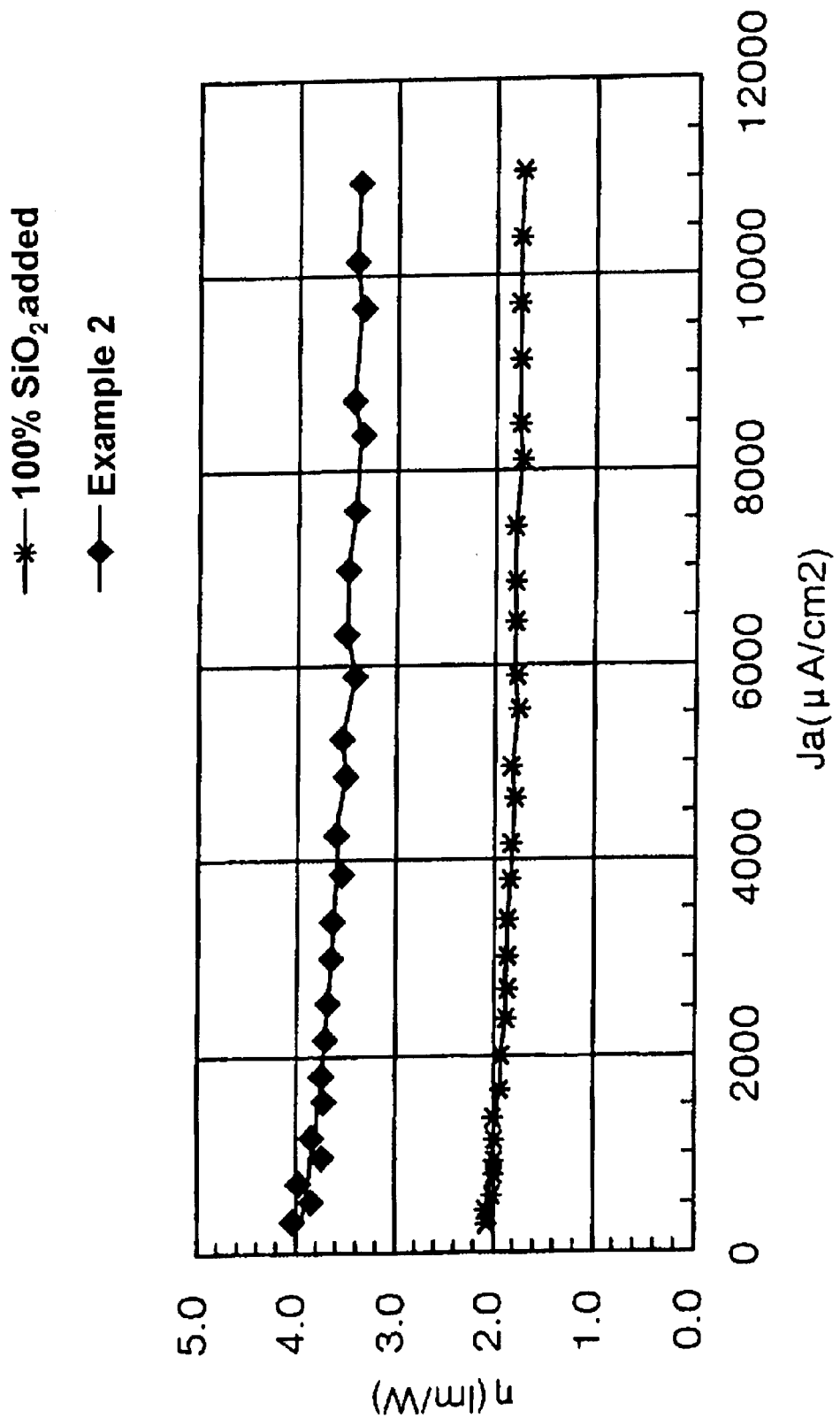
FIG. 6 exhibits the relationship between the current density and the luminous efficiency of the FEDs having the phosphor of Example 2 and a phosphor (100% $SiO_2$ added) as a comparative example, respectively.

An FED for high voltage use was prepared using the phosphor of Example 2. The luminous efficiency of the display obtained was measured by allowing the luminous layer to emit at an anode voltage of 3 kV and the relationship between the luminous efficiency and the current density was determined as shown in FIG. 6. The FED obtained above had a 1.8 fold higher luminous efficiency than an FED prepared using the primary phosphor having a relative amount 100% $SiO_2$. It suggests that the phosphor has an optimum composition even at a considerable depth from the surface. Specifically, when the acceleration voltage of an electron beam is 3 kV, the electron can reach the depth of 500 to 600 Å from the surface of the phosphor; and therefore, this Example suggests that the phosphor has the desired composition at least to such a depth. A similar result was obtained at an acceleration voltage of 5 kV.

EXAMPLE 4

A $SiO_2$ powder was mixed with co-precipitate (Y, Tb)$_2O_3$ (the Tb/Y atomic ratio was 0.06), in amounts of 50 and 100 mol % based on the amount of (Y, Tb)$_2O_3$ to produce the mixtures, respectively, and each mixture was charged into the inner crucible of a double-walled aluminum crucible. After graphite was charged between the inner and outer crucible, the mixture was calcined at 1450° C. for 2 hours. Thus obtained were two $Y_2SiO_5$:Tb phosphors; a phosphor (50% $SiO_2$) of this Example and a comparative phosphor (100% $SiO_2$).

Each of the resulting $Y_2SiO_5$:Tb phosphors was powdered, and a slurry containing the powder was coated on an anode substrate using a conventional slurry coating process to form a luminous layer. The anode substrate coated with the luminous layer was combined with a cathode substrate to obtain a field emission display (FED).

The luminous efficiency of the display obtained was measured by allowing the luminous layer to emit at an anode voltage of 600V, an electric power input of 30 Wp-p and a duty rate of 1/240.

The FED obtained using the phosphor(50% $SiO_2$) of this Example had a luminous efficiency and a residual luminance after certain lifetime which were 108% higher and 178% higher, respectively, as compared with the FED prepared using the comparative phosphor. The surface (Y+Tb)/Si atomic ratio of the phosphor of this Example was determined by AES to be 1.85, while that of the comparative phosphor(100% $SiO_2$) was 1.05. The phosphor of this Example thus has a modified surface.

EXAMPLE 5

A $SiO_2$ powder was mixed with co-precipitate (Gd, Ce)$_2$O$_3$ (the Ce/Gd atomic ratio was 0.01), in an amount of 50 and 100 mol % based on the amount of (Gd, Ce)$_2$O$_3$ to produce two mixtures, respectively, and each mixture was charged into the inner crucible of a double-walled aluminum crucible. After graphite was charged between the inner and outer crucible, the mixture was calcined at 1400° C. for 2 hours. Thus obtained were two $Gd_2SiO_5$:Ce phosphors; a phosphor(50% $SiO_2$) of this Example and a comparative phosphor(100% $SiO_2$).

Each of the resulting $Gd_2SiO_5$:Ce phosphors was powdered, and a slurry containing the powder was coated on an anode substrate using a conventional slurry coating process to form a luminous layer. The anode substrate coated with the luminous layer was combined with a cathode substrate to obtain a field emission display (FED).

The luminous efficiency of the display obtained was measured by allowing the luminous layer to emit at an anode voltage of 600V, an electric power input of 30 Wp-p and a duty rate of 1/240. The FED prepared using the phosphor of this Example had a luminous efficiency and residual luminance after certain lifetime which were 112% higher and 165% higher, respectively, as compared with the FED prepared using the comparative phosphor. The surface Gd/Si atomic ratio of the phosphor of this Example was determined by AES to be 1.74, while that of the comparative phosphor (100% $SiO_2$) was 1.12. The phosphor of this Example thus has a modified surface.

In accordance with the same procedure as in Example 5, a phosphor having good performance characteristics can also be prepared by using (Gd, Tb)$_2$O$_3$ and a fine powder of $SiO_2$.

While the embodiments of the subject invention have been described and illustrated, it is obvious that various changes and modifications can be made therein without departing from the spirit of the present invention which should be limited only by the scope of the appended claims.

What is claimed is:

1. A phosphor of formula $A_2SiO_5$:B which is characterized by a surface elemental composition represented by (A+B)/Si being in the range of 1.5 to 2.5; wherein A is Y or Gd, and B is Ce or Tb.

2. A method of preparing the phosphor of claim 1, comprising mixing (A, B)$_2$O$_3$ and $SiO_2$ in an amount of 40 to 70 mol % based on the amount of (A, B)$_2$O$_3$ to produce a mixture, and calcining the mixture; wherein A is Y or Gd, and B is Ce or Tb.

3. A method of preparing the phosphor of claim 1, comprising adding a (A, B)$_2$O$_3$ powder to a compound of formula $A_2SiO_5$:B having a stoichiometric amount of Si and calcining the mixture; wherein A is Y or Gd, and B is Ce or Tb.

4. A method of claim 3, wherein the addition step is conducted by coating the compound of formula $A_2SiO_5$:B with a fine powder of (A, B)$_2$O$_3$.

* * * * *